(12) United States Patent
Lin et al.

(10) Patent No.: US 7,173,652 B2
(45) Date of Patent: *Feb. 6, 2007

(54) METHOD FOR DETECTING MOVEMENT OF IMAGE SENSORS

(75) Inventors: Chun-Huang Lin, Hsinchu (TW); Jeng-Feng Lan, Hsinchu (TW); Chien-Chang Huang, Hsinchu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/415,692

(22) Filed: May 1, 2006

(65) Prior Publication Data

US 2006/0203094 A1    Sep. 14, 2006

Related U.S. Application Data

(63) Continuation of application No. 10/108,041, filed on Mar. 27, 2002, now Pat. No. 7,053,932.

(30) Foreign Application Priority Data

Oct. 31, 2001   (TW) .............................. 90127006 A

(51) Int. Cl.
    *H04N 5/228* (2006.01)

(52) U.S. Cl. .................................. 348/208.4; 348/208.1
(58) Field of Classification Search ..................... None
    See application file for complete search history.

(56) References Cited

U.S. PATENT DOCUMENTS

| 6,172,354 | B1 | 1/2001 | Adan et al. |
| 6,433,780 | B1 | 8/2002 | Gordon et al. |

*Primary Examiner*—Ngoc-Yen Vu
*Assistant Examiner*—Anthony J. Daniels
(74) *Attorney, Agent, or Firm*—Tung & Associates

(57) ABSTRACT

A method to detect the movement of an image sensor. Movement is detected according to a first, second, third, and fourth frame, all captured by the image sensor. A first captured image region is captured from the first frame. Then, a first corresponding region matching the first captured image region is captured from the second frame, wherein the first corresponding region shifts in a predetermined direction relative to the first captured image region. Next, a second captured image region is captured from the third frame, wherein the second captured image region shifts in a direction opposite to the predetermined direction relative to the first captured image region. Then, a second corresponding region matching the second captured image region is captured from the fourth frame. Finally, the movement of the image sensor is determined according to the second captured image region and the second corresponding region.

2 Claims, 5 Drawing Sheets

METHOD FOR DETECTING MOVEMENT OF IMAGE SENSORS

CROSS-REFERENCE TO RELATED APPLICATIONS

This application is a continuation application of and claims priority to U.S. patent application Ser. No. 10/108,041, filed on Mar. 27, 2002 now U.S. Pat. No. 7,053,932.

BACKGROUND OF THE INVENTION

1. Field of the Invention

The present invention relates in general to a method to detect the movement of an image sensor. In particular, the present invention relates to a method for detecting movement of an image sensor by comparing the images captured by the image sensor at different places. After finding the matching images, the moving direction of the image sensor is determined, then the image captured region of the next image is determined according to the moving direction of the image sensor to determine the movement of the image sensor successfully.

2. Description of the Related Art

Normally, the prior arts use block matching to determine the movement of an image sensor. Ideally, this method can correctly find a matching frame block generated from matching function, mean squared error (MSE) or mean absolute difference (MAD), then use the matching frame blocks to calculate the movement of the image sensor.

FIG. 1A and FIG. 1B show the conventional method of determining the movement of an image sensor by block matching. The frame 10A is the image captured by the image sensor in a first location, and the frame 10B is the image captured by the image sensor when the image sensor moves to a second location. Here, the size of the frame captured by the image sensor is 6×6 units, and the frame 10A is divided into 9 parts by 2×2 units. Then, the frame 10B is searched to find a frame block matching the frame block 12A in frame 10A.

However, there are actually many sources of noise, not only from image and process variation, but also from the environment of the image sensor such as temperature and illumination variation. Therefore, the matching result obtains a frame block 12B having a gray scale close to the frame block 12A, wherein the value of the matching function is the minimum.

Since the image sensor has limited size and frame rate (frame per second), and for cost issues, the smaller sensor array always has lower cost for a chip. Assuming the sensor array size is M×M, the central block is N×N, image sensor pixel size is PN×PN, and the frame rate is FN frame, then the maximum horizontal and vertical detectable range of the image sensor is ±(M−N)/2 or the maximum horizontal and vertical velocity of image sensor is PN×[±(M−N)/2]×FN. Using central block as a template can make the horizontal and vertical detectable range or velocity balance. It is possible that the image sensor may move too fast to make the successive two images have no overlapped image, that is the movement is beyond the movable range or the velocity of the image sensor is faster than the maximum velocity. This will make this motion detection method generate a wrong displacement.

FIG. 2A and FIG. 2B show a situation when the conventional motion detecting method generates the wrong displacement.

The frame 20A is the image captured by the image sensor in a first location, and the frame 20B is the image captured by the image sensor when the image sensor moves to a second location. Then, the frame 20B is searched to find a frame block matching the frame block 22A in frame 20A. If the moving velocity of the image sensor surpasses in the hardware capacity, there is no frame block in the frame 20B matching the frame block 22A, therefore, the conventional motion detecting method fails.

SUMMARY OF THE INVENTION

The object of the present invention is to provide a method to detect the movement of an image sensor, which increases the moving range and velocity of an image sensor with the same captured image array. As well, the present invention obtains the same moving range and velocity of an image sensor with smaller captured image array.

To achieve the above-mentioned object, the present invention provides a method to detect the movement of an image sensor according to a first, second, third, and fourth frame, all captured by the image sensor, including the following steps. First, a first captured image region is captured from the first frame. Then, a first corresponding region matching the first captured image region is captured from the second frame, wherein the first corresponding region shifts in a predetermined direction relative to the first captured image region. Next, a second captured image region is captured from the third frame, wherein the second captured image region shifts in a direction opposite to the predetermined direction relative to the first captured image region. Then, a second corresponding region matching the second captured image region is captured from the fourth frame. Finally, the movement of the image sensor is determined according to the second captured image region and the second corresponding region.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE PREFERRED EMBODIMENT

Since a moving image sensor has inertia, we can predict it will keep moving in the same direction during the next time unit. Once the velocity is decreased, we can predict that it has already started to change its direction, that is, it has acceleration in the opposite direction.

Figure 1A:
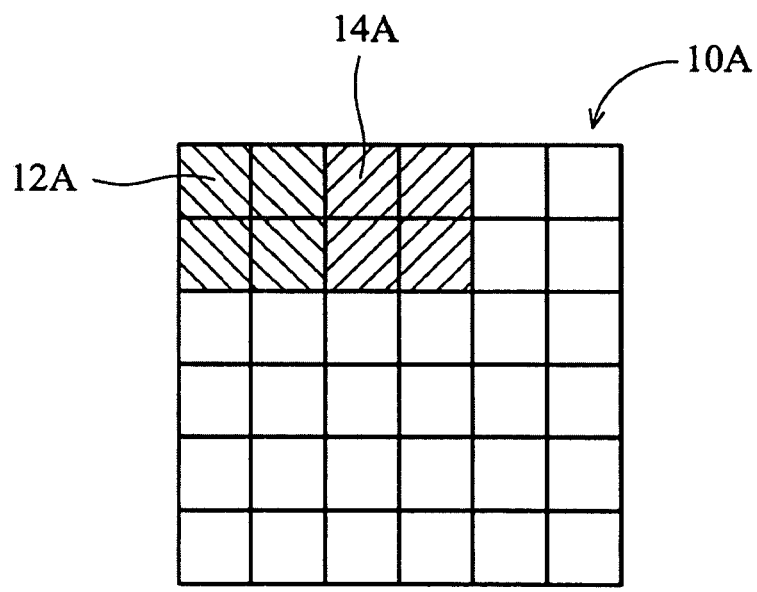
FIG. 1A and FIG. 1B show the conventional method of determining the movement of an image sensor by block matching.
Figure 1B:
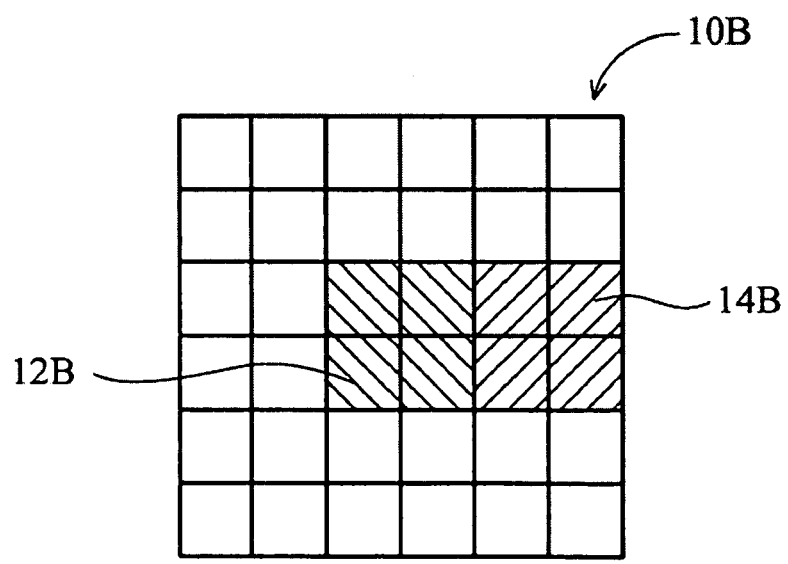
Figure 2A:
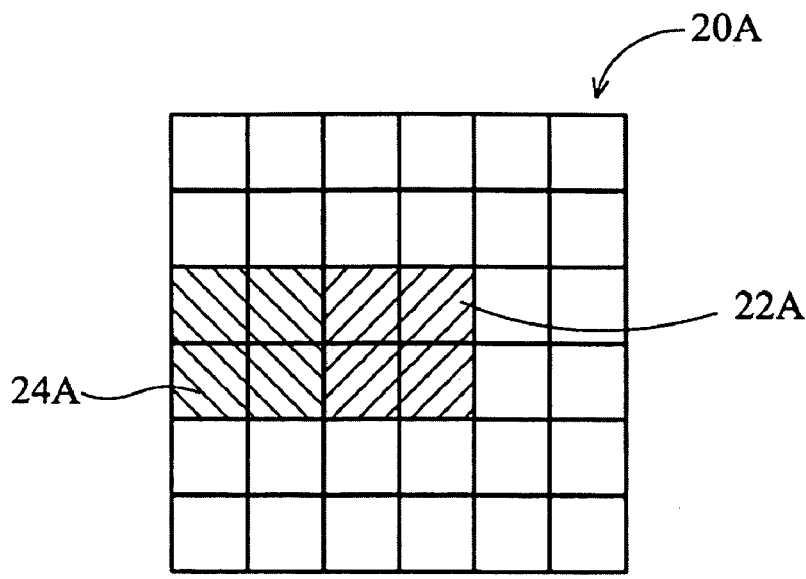
FIG. 2A and FIG. 2B show an example when the conventional motion detecting method generates the wrong displacement.
Figure 2B:
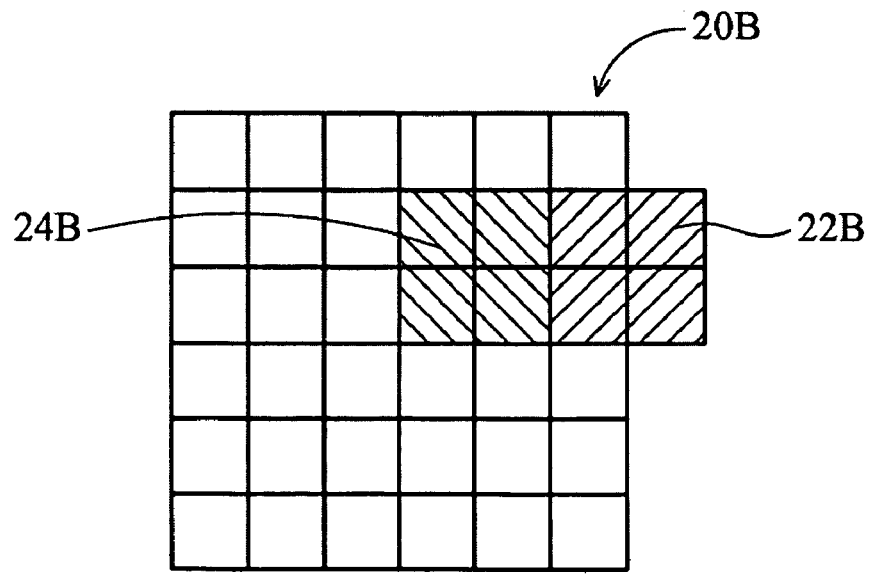

According to the inertia acting upon the moving object, the present invention predicts the motion of the image sensor and automatically increases the movable range on the same size of the image sensor. As the example shows in FIGS. 2A and 2B, there is no frame block in the frame 20B matching the frame block 22A. If the frame 20B is searched according to the frame block 24A, the matching frame block 24B is obtained successfully. Therefore, the movement of the image sensor is obtained. In the present invention, the frame block 24A is selected according to the inertia acting upon the moving object.

Figure 3A:
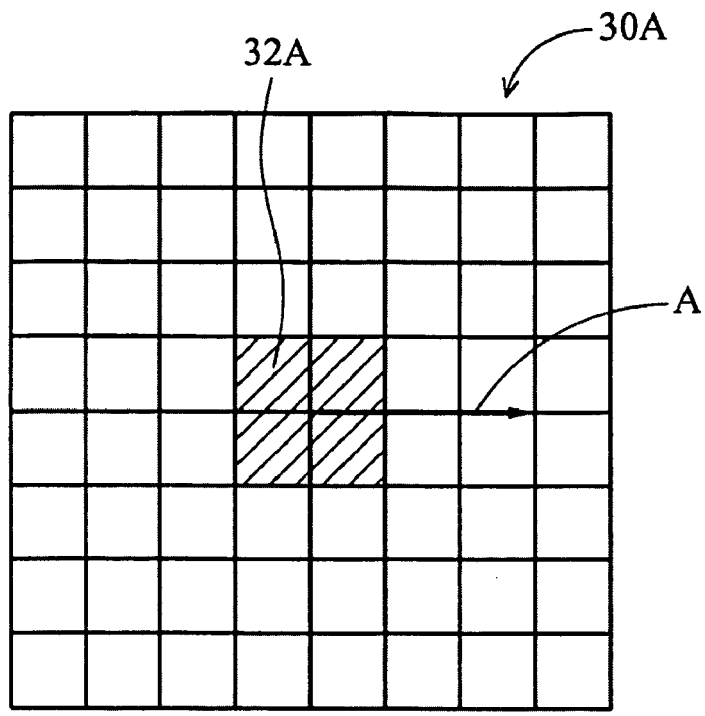
FIGS. 3A–3D show the method of determining the movement of an image sensor by block matching according to the embodiment of the present invention.
Figure 3B:
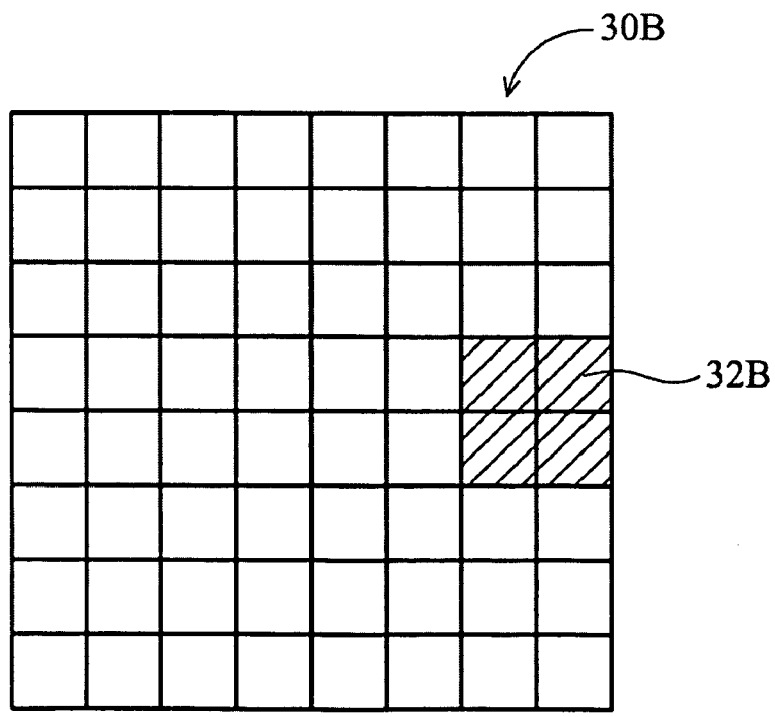
Figure 3C:
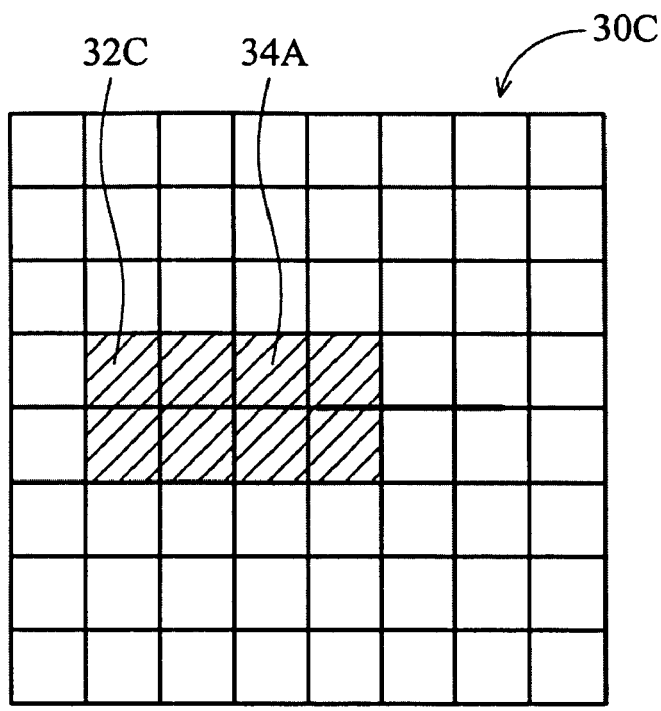
Figure 3D:
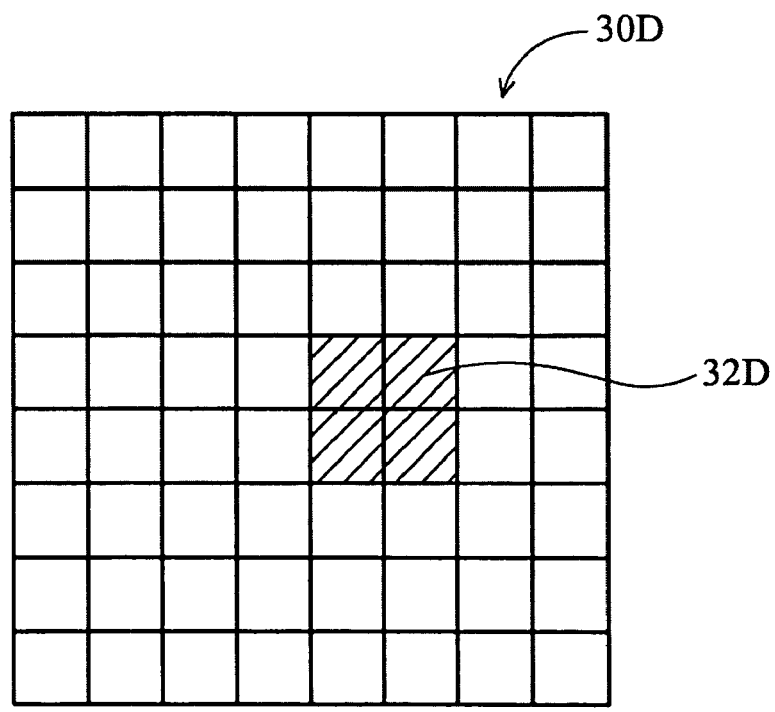

FIGS. 3A–3D show the method of determining the movement of an image sensor by block matching according to the embodiment of the present invention. First, a first captured image region 32A is captured from the first frame 30A. Then, a first corresponding region 32B matching the first captured image region 32A is captured from the second frame 30B, wherein the first corresponding region 32B shifts in a predetermined direction relative to the first captured image region 32A (as shown in vector A). Next, the movement or velocity of the image sensor is determined according to the first region 32A and the first corresponding region 32B. When the image sensor keeps in predetermined movement or velocity in a predetermined period, a second captured image region 32C is captured from the third frame 30C, wherein the second captured image region 32C shifts in a direction opposite to the direction of vector A relative to the first captured image region 32A. Then, a second corresponding region 32D matching the second captured image region 32C is captured from the fourth frame 30D. Finally, the movement of the image sensor is determined according to the second captured image region 32C and the second corresponding region 32D. As shown in FIG. 3D, the second corresponding region 32D is farther from the boundary of the fourth frame 30D relative to the first corresponding region 32B, which increases the chance to obtain the matching frame block.

Figure 4:
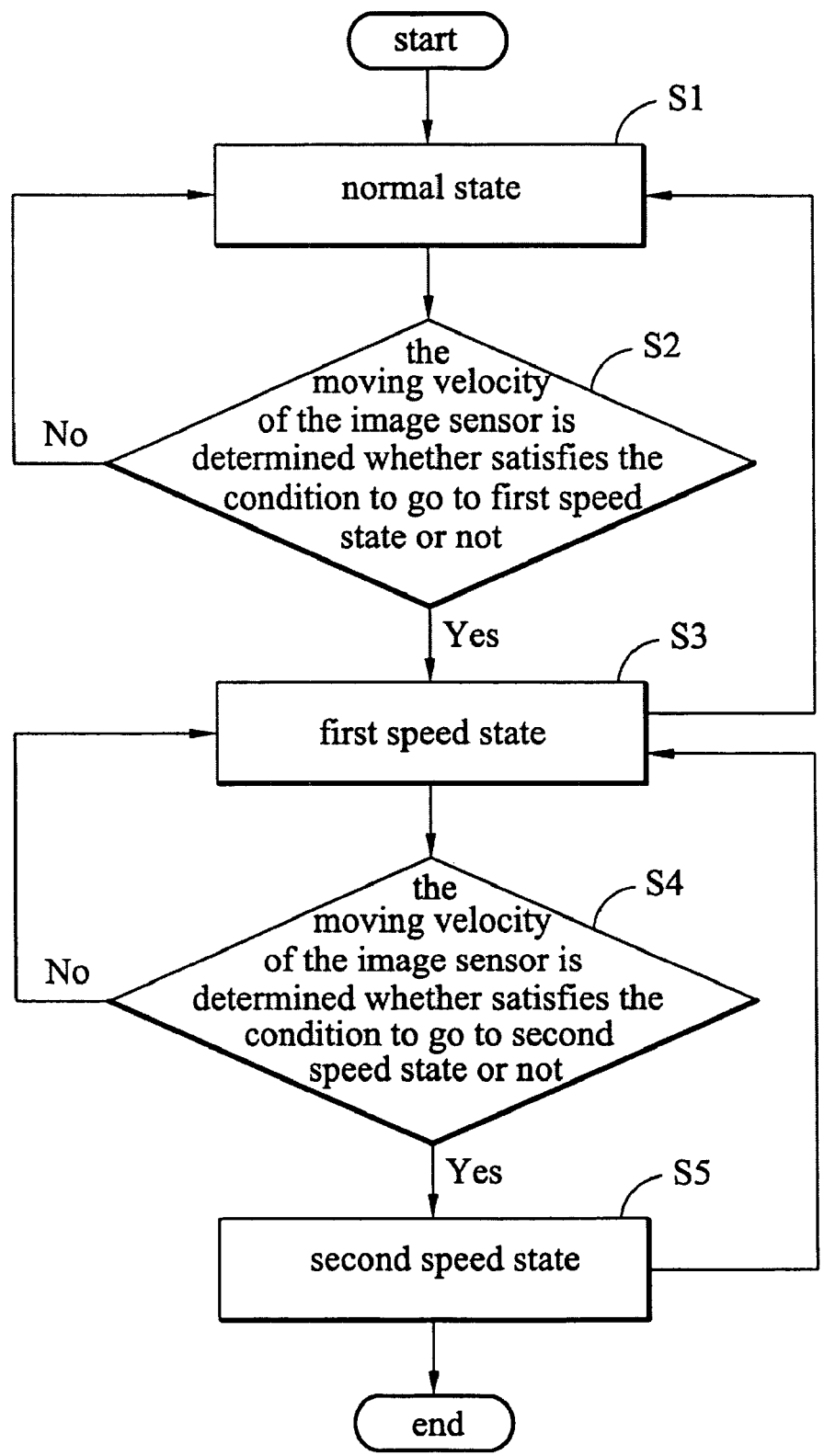
FIG. 4 shows a flow chart of the method of determining the movement of an image sensor according to the embodiment of the present invention.

In the present embodiment, for example, the sensor array is 20×20, the block size is 10×10, pixel size is 60 um×60 um, and the frame rate of the image sensor is 1500 frame/sec. FIG. 4 shows an algorithm of proposed. For two-dimension movement, this algorithm can apply to horizontal and vertical direction independently. In this algorithm, there are three states, however, for real application, any state is allowed, and need only meet the performance, accuracy and cost requirement.

FIG. 4 shows the flow chart of the method of determining the movement of an image sensor according to the embodiment of the present invention. First, in normal state (S1), a central frame block of an image sensor is captured. The detectable range of the image sensor is ±5 unit pixels. Therefore, the maximum velocity of the image sensor is 45 cm/sec (60(um)×5(pixel/frame)×1500 (frame/sec)=45(cm/sec)).

Next, the velocity of the image sensor is checked as to whether it satisfies the condition to go to first speed state or not (S2). In the present invention, the conditions of the first speed state is that the image sensor continuously moves 2 pixels in 83 frames. Therefore, if the image sensor continuously moves 1 cm at the velocity 18 cm/sec, it goes to first speed state, otherwise, it maintains its normal state.

Next, in first speed state (S3), another frame block of an image sensor is captured, which shifts 3 pixels from the center of the image sensor. Here, the shift direction is opposite to the moving direction of the moving directing of the corresponding frame block. The detectable range of the image sensor becomes −3~7 or −7~3 unit pixels. Because the image sensor keeps moving in the same direction, the maximum velocity of the image sensor is 63 cm/sec (60 (um)×7(pixel/frame)×1500(frame/sec)=63(cm/sec)). However, if the motion of the image sensor is less than 2 pixels in a frame time, goes back to normal state (S1).

Next, the moving velocity of the image sensor is checked as to whether it satisfies the condition to go to second speed state or not (S4). In the present invention, the conditions of the second speed state is that the image sensor continuously moves 3 pixels in 83 frames. Therefore, if the image sensor continuously moves 1.5 cm at the velocity 27 cm/sec, then goes to second speed state, else, keeps in first speed state.

Next, in second speed state (S5), another frame block of an image sensor is captured, which shifts 5 pixels from the center of the image sensor. Here, the shift direction is opposite to the moving direction of the moving directing of the corresponding frame block, and the shift displacement is increased. The detectable range of the image sensor becomes 0~10 or 10~0 unit pixels. Because the image sensor keeps moving in the same direction, the maximum velocity of the image sensor is 90 cm/sec (60(um)×10(pixel/frame)×1500 (frame/sec)=90 (cm/sec)). However, if the motion of the image sensor is less than 3 pixels in a frame time, goes back to first speed state (S3).

Therefore, the original detectable range and velocity of the image sensor is ±5 pixels and 45 cm/sec, and the new detectable range and velocity of the image sensor become ±10 pixels and 90 cm/sec using the method of the present invention, which is the maximum detectable range and velocity of the image sensor with 20×20 array size, 10×10 block size, 60 um×60 um pixel size and 1500 frame/sec detectable frame rate.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for detecting the movement of an image sensor according to a first, second, third, and fourth frame, captured sequentially by the image sensor, comprising the following steps:

selecting a first captured image region in the first frame;

selecting a first corresponding region to match the first captured image region in the second frame, wherein the first corresponding region shifts in a predetermined direction relative to the first captured image region;

selecting a second captured image region in the third frame, wherein the second captured image region shifts in a direction opposite to the predetermined direction relative to the first captured image region;

selecting a second corresponding region to match the second captured image region in the fourth frame; and determining the movement of the image sensor according to the second captured image region and the second corresponding region.

2. The method for detecting the movement of an image sensor as claimed in claim 1, wherein the first captured image region is near the center of the first frame.

* * * * *